US005133915A

United States Patent [19]

Metten et al.

[11] Patent Number: 5,133,915

[45] Date of Patent: Jul. 28, 1992

[54] PROCESS FOR THE PRODUCTION AND TREATMENT OF CONCRETE BLOCKS

[76] Inventors: Josef Metten; Hans-Josef Metten, both of Mutzerstr. 21, 5060 Bergisch Gladbach 2, Fed. Rep. of Germany

[21] Appl. No.: 522,589

[22] Filed: May 11, 1990

[51] Int. Cl.[5] .......................... B28B 3/02; B28B 11/08; B29C 59/02

[52] U.S. Cl. .................................... 264/162; 264/293; 264/296; 264/297.9; 264/310; 264/333; 425/218; 425/220; 425/385

[58] Field of Search ..................... 264/162, 163, 297.9, 264/333, 256, 133, 69, 293, 294, 296, 310; 425/218, 220, 385

[56] References Cited

U.S. PATENT DOCUMENTS

| | | | |
|---|---|---|---|
| Re. 27,109 | 3/1971 | Videen | 264/162 X |
| 1,229,582 | 6/1917 | Butterworth | 264/162 X |
| 1,672,938 | 6/1928 | Hervey | 264/162 X |
| 1,891,764 | 12/1932 | Henderson | 264/297.9 X |
| 3,425,105 | 2/1969 | Gulde | 264/256 |
| 4,206,163 | 6/1980 | De Coster | 264/333 X |
| 4,249,358 | 2/1981 | Thieffry | 264/297.9 X |
| 4,495,132 | 1/1985 | Johnson | 264/133 X |
| 4,655,981 | 4/1987 | Nielsen et al. | 264/162 |
| 4,886,633 | 12/1989 | Rook et al. | 264/297.9 X |

FOREIGN PATENT DOCUMENTS

| | | | |
|---|---|---|---|
| 2929935 | 2/1981 | Fed. Rep. of Germany | 264/256 |
| 3621276 | 1/1988 | Fed. Rep. of Germany | 264/69 |
| 2340809 | 9/1977 | France | 264/162 |
| 3130308 | 6/1988 | Japan | 264/333 |
| 267948 | 8/1927 | United Kingdom | 264/297.9 |

*Primary Examiner*—Jan H. Silbaugh
*Assistant Examiner*—Karen Aftergut

[57] ABSTRACT

A process for the production and treatment of concrete blocks, which are produced in molds filled with concrete and are imprinted on their surface by means of dies that exhibit recesses or protrusions. Subsequently thereto, the surface of the concrete blocks is roughened or formed or textured and freed of loose particles by brushes, in particular strip brushes and roller brushes.

10 Claims, 2 Drawing Sheets

PROCESS FOR THE PRODUCTION AND TREATMENT OF CONCRETE BLOCKS

TECHNICAL FIELD

This invention relates to a process for the production and/or treatment of concrete blocks, in particular paving stones, wherein production takes place in molds filled with concrete and dies corresponding to the mold or the block surface for imprinting of the surface and visible edges, said dies exhibiting recesses or protrusions, and wherein the surfaces or edges of the concrete blocks are worked with brushes in a subsequent operation.

PRIOR ART STATEMENT

Heretofore the surfaces or edges of the concrete blocks have been worked to free them of loose particles and/or additionally to roughen, shape or structure said surfaces or edges.

OBJECTS AND BRIEF SUMMARY OF THE INVENTION

It is the object of the present invention to introduce simple and practical but effective brush designs or configurations to the edges or visible surfaces of concrete blocks. In accordance with the invention, this object is achieved by virtue of the fact that the brushes execute an oscillating motion parallel to the surface of the concrete blocks. By means of this oscillating motion, the brushes stroke over the blocks not only in one direction but back and forth in opposing directions, so that a very advantageous reworking of the surfaces or edges of the concrete blocks takes place. The stroke of the oscillating motion can be varied or adjusted so that a stroke reversal with a corresponding change in the bending direction of the bristles of the brushes takes place on the surface of the concrete blocks. It is of essential importance that the blocks not yet be hardened, i.e., that they be in the fresh condition or only slightly dried or hardened so that optimal working can take place.

In a further embodiment of the invention, it is proposed that the oscillating direction of motion of the brushes take place at an acute angle to the direction of motion of the concrete blocks so that all edges of the concrete blocks are uniformly worked. The brushes are advantageously made as strip brushes, whose length is a multiple of the concrete block dimensions. Thus, the brush working process can advantageously be located spatially and temporally immediately adjacent to the imprinting of the concrete blocks, especially since, in imprinting, a plurality of concrete blocks are preferably produced at one time, said concrete blocks leaving the machine on a pallet in one direction of motion. Thus, a plurality of concrete blocks are preferably worked by means of the strip brush at one time. A plurality of strip brushes can also be provided, said brushes being arranged at an angle or offset in relation to one another.

It has provided advantageous to arrange a plurality of diverse brushes one behind another so that a plurality of concrete block surfaces can be simultaneously worked.

BRIEF DESCRIPTION OF THE DRAWINGS

For further explanation of the invention, reference is made to the drawings, in which several exemplary embodiments of the invention are illustrated in simplified form, namely.

DETAILED DESCRIPTION OF THE DRAWINGS

Figure 1:
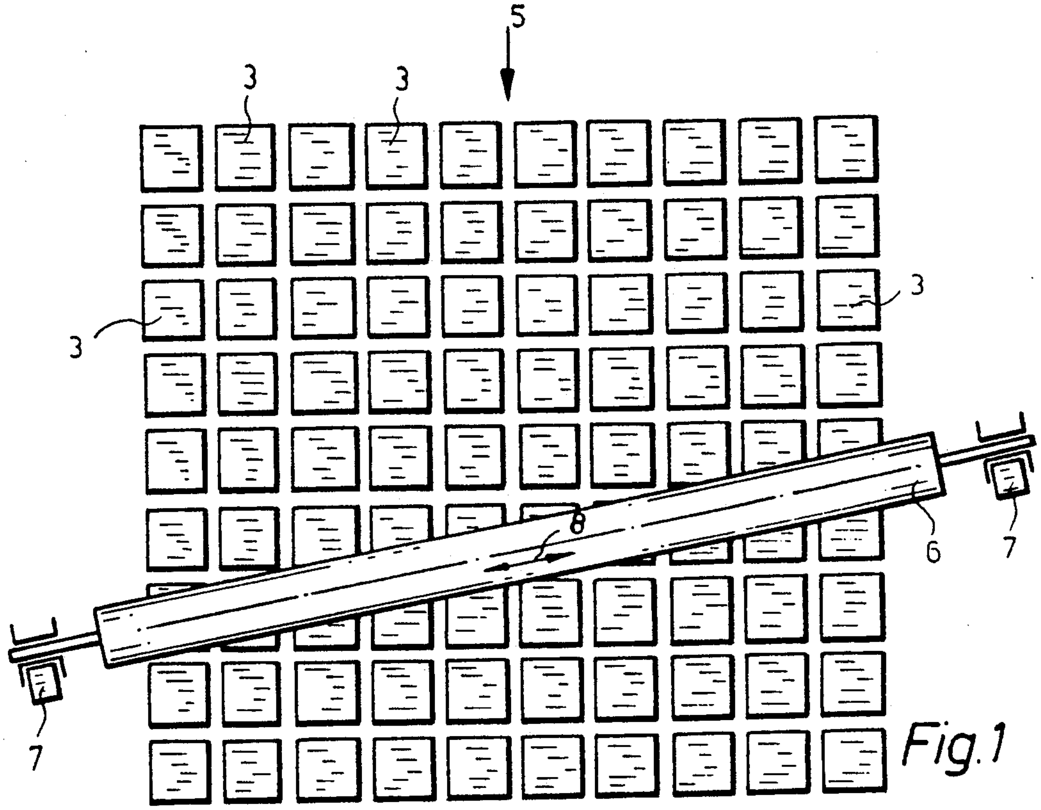
FIG. 1 shows a plan view of a plurality of concrete blocks with a strip brush arranged thereabove.
Figure 2:
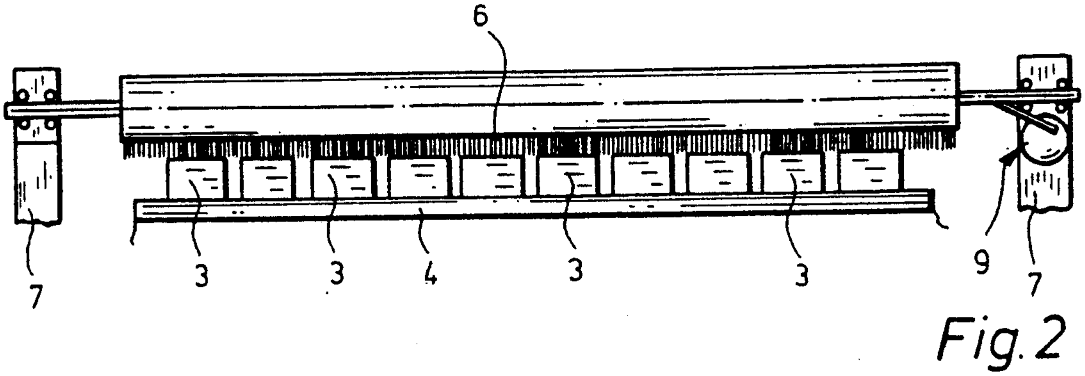
FIG. 2 shows a side view of the concrete blocks and a strip brush.
Figure 3:
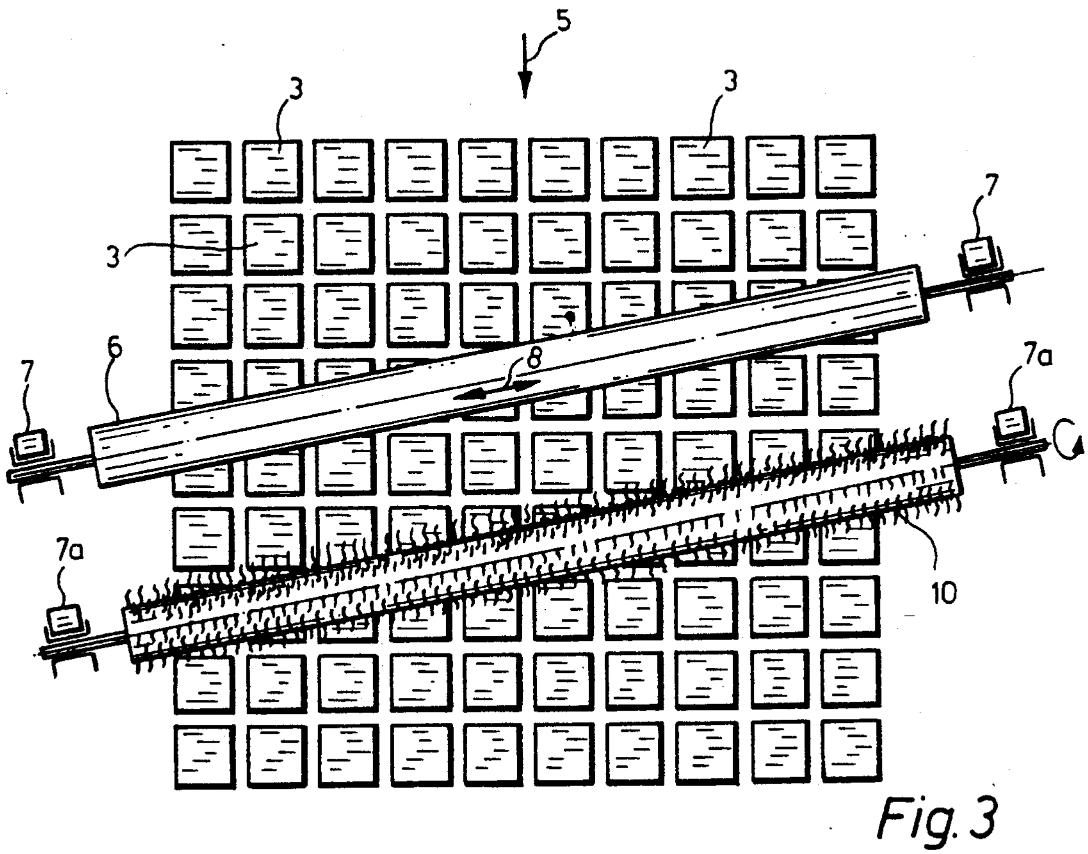
FIG. 3 shows a plan view with strip brushes and roller brushes arranged above the concrete blocks.

In FIGS. 1 through 3, insofar as individually illustrated, 3 denotes concrete blocks of predetermined dimensions, which, as FIG. 2 shows, are arranged on a substrate or pallet 4 that is moved in the direction of the arrow 5 (a predetermined horizontal direction). Above the concrete blocks 3 a strip brush denoted by 6 is arranged, said brush being supported on columns 7 in such a fashion that it can be moved oscillatingly back and forth in the direction of the double arrow 8 which direction is oblique to the direction of movement of the concrete blocks and parallel to the upward facing surfaces of the blocks. The translational reciprocating movement in the direction of the double arrow 8 is generated by a pitman type drive 9 located on one of the columns.

FIG. 3 shows an exemplary embodiment in which a cylindrical roller brush 10 is provided in addition to, and parallel to, the strip brush 6. The roller brush 10 is rotatably supported in columns 7*a* on an axis oblique to the direction of movement of the concrete blocks but parallel to the surface of the blocks. By its means, a reworking of the concrete blocks or texturing of their top surfaces and the edges of such top surfaces is effected.

The columns can be moved on the floor in such a fashion that an optimal angular configuration of the strip brush and the brush roller can be set relative to the direction of movement of the concrete blocks and relative to one another. Further, the strip brush 6 and roller brush 10 are adjustable in height on the columns so that their intensity can also be varied. The stroke of the oscillating motion of the strip brush 6 and the stroke frequency, as well as the rotation speed of the roller brush, can be varied so that the desired working effect occurs.

The embodiments of the invention in which an exclusive property or privilege is claimed are defined as follows:

1. A process for the production of concrete blocks of predetermined dimensions, including the steps of molding the blocks by filling molds with concrete and impressing dies corresponding in size to the tops of said blocks onto the top surfaces of said blocks for texturing said top surfaces and edges of said top surfaces, then working said top surfaces and edges of said top surfaces of said concrete blocks with brushes with at least one brush disposed above said blocks executing a translational reciprocating motion in a direction parallel to said top surfaces of said concrete blocks (3) and at an oblique angle to the direction of movement of said concrete blocks as the latter are moved in a predetermined horizontal direction (5), thereby introducing brush designs to said top surfaces and edges of said top surfaces.

2. The process in accordance with claim 1 wherein said one brush is a strip brush (6) whose length corresponds to a multiple of said concrete block dimensions.

3. The process in accordance with claim 2 wherein a plurality of brushes (6, 10) are arranged one behind the other in said direction (5) of movement of said concrete blocks (3).

4. The process in accordance with claim 3 wherein said strip brush (6) and a roller brush (10) are arranged one behind another.

5. The process in accordance with claim 4 wherein the axis of rotation of said roller brush (10) is parallel to said direction of said reciprocating motion (8) of said strip brush (6).

6. The process in accordance with claim 4 wherein the axis of rotation of said roller brush (10) extends at an angle to said direction of said reciprocating motion (8) of said strip brush (6).

7. The process in accordance with claim 4 wherein said blocks are arranged on a moving pallet after being molded and said brushes extend across the width of said pallet.

8. The process in accordance with claim 1 wherein said blocks, after being molded, are arranged on a pallet, said pallet is moved in a predetermined horizontal direction and said one brush extends across the width of said pallet at an oblique angle to said direction of movement of said moving pallet.

9. The process in accordance with claim 8 wherein said top surfaces and edges of said blocks are also engaged by a rotating roller brush extending across the width of said blocks on said moving pallet.

10. The process in accordance with claim 9 wherein the axis of said roller brush is parallel to said top surfaces of said blocks being worked and parallel to said one brush.

* * * * *